Jan. 14, 1958 R. B. BENNETT ET AL 2,820,070
METHOD FOR RECOVERING PARAXYLENE
Filed Feb. 28, 1957
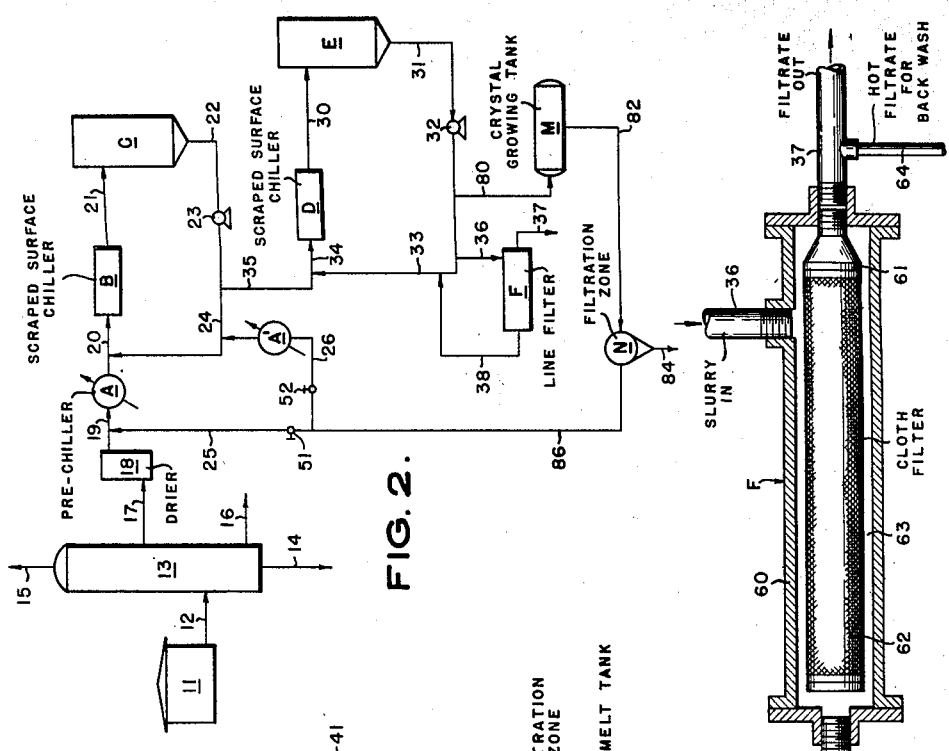
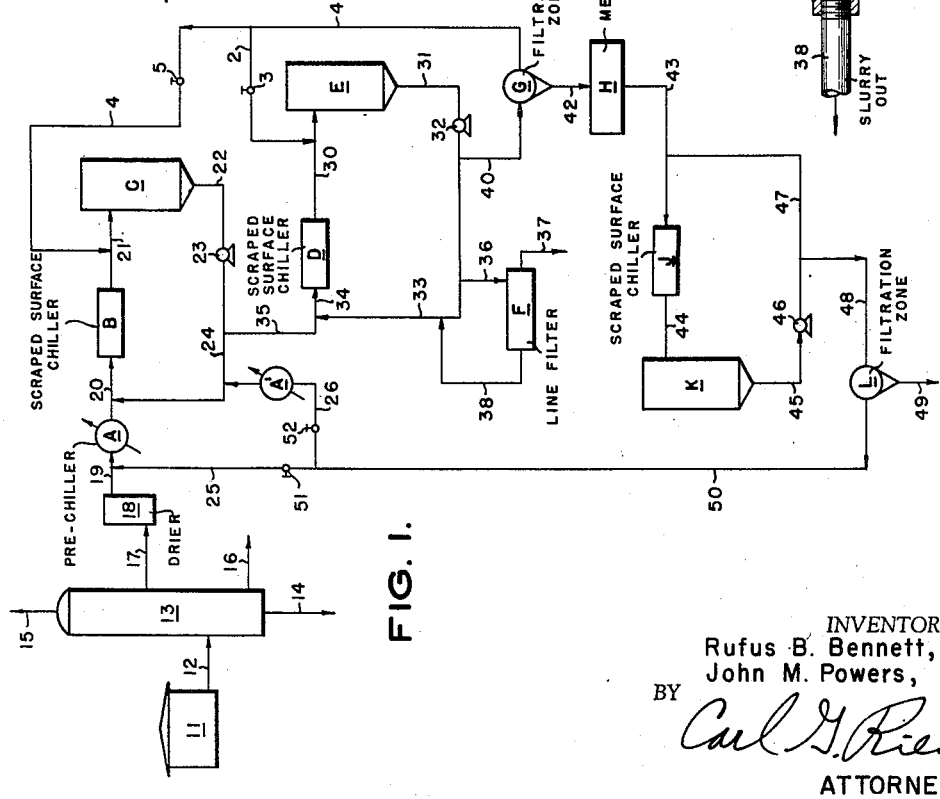
INVENTORS.
Rufus B. Bennett,
John M. Powers,
BY
ATTORNEY.

United States Patent Office 2,820,070
Patented Jan. 14, 1958

2,820,070

METHOD FOR RECOVERING PARAXYLENE

Rufus B. Bennett and John M. Powers, Baytown, Tex., assignors, by mesne assignments, to Esso Research and Engineering Company, Elizabeth, N. J., a corporation of Delaware Application February 28, 1957, Serial No. 643,106

11 Claims. (Cl. 260—674)

This application is directed to a method for separating a material crystallizable upon chilling from a liquid mixture.

This application is a continuation-in-part of Bennett and Powers applications S. N. 434,992 and S. N. 434,993, both filed June 7, 1954, and now abandoned.

In accordance with the present invention a feed stock containing a selected component which crystallizes upon chilling is used to form a first body of slurry in which the solid is said crystallizable component and said slurry is concentrated by subjecting portions to an isothermal filtration step which separates a filtrate which is discarded and a more concentrated slurry which is returned to said first body of slurry.

In accordance with one form of the present invention, a first filter cake fraction is obtained from said first body of slurry by withdrawing a portion of the slurry and separating it in a second filtration step into a first filter cake fraction and a second filtrate fraction, all the components of which are returned to said first body of slurry. The first filter cake is then melted and rechilled to form a second body of slurry. A portion of the second body of slurry is filtered to form a second filter cake which is recovered as a purified product and a third filtrate which is returned to the first body of slurry.

In accordance with another form of the invention, a stream of slurry is withdrawn from said first body of slurry and passed to a crystal growing step at a temperature substantially greater than the temperature of said first body of slurry but below the melting point of said crystals to cause an increase in the average size of said crystals and slurry is withdrawn from said crystal growing step and passed to a filtration step where it is separated into a filter cake which is withdrawn as a purified product and a second filtrate fraction, all the components of which are returned to the first body of slurry.

It is a feature of the case that the only material withdrawn is the filtrate separated in the isothermal filtration step which is discarded and the filter cake which forms the desired product.

In accordance with the present invention, a selected organic material which crystallizes upon chilling is separated from a mixture of organic compounds by establishing a body of slurry in which the solid consists of crystals of said selected compounds. Preferably the body of slurry consists of a crystal growing pool from which a stream of slurry is continuously withdrawn, passed through an indirect heat exchanger and returned to the crystal growing pool. Slurry is withdrawn from the body of slurry and passed to an isothermal filtration step to separate a filtrate fraction which is discarded from the body of slurry and a more concentrated slurry fraction which is returned to said body of slurry. By way of example, the isothermal step may be carried out in a line filter. It is a particular advantage that the isothermal filtration step separates a filtrate which has essentially the same composition as the mother liquor of the slurry and hence none of the previously crystallized material is lost in the filtrate. From the body of slurry a portion of slurry is withdrawn and sent to a second filtration step where it is separated into a filtrate fraction and a filter cake fraction. For operating reasons, the second filtration step usually is not isothermal.

Specific examples of feed stocks which may be treated in accordance with the present invention are:

A xylenes mixture containing approximately 16 volume percent paraxylene which, upon chilling to —95° F. results in a slurry containing approximately 9 volume percent paraxylene crystals. An aromatic hydrocarbon fraction boiling between 365° and 425° F. containing 10 volume percent durene (1,2,4,5 tetramethylbenzene) which, upon chilling to about —60° F., gives a slurry of about 6 volume percent durene crystals. A naphthenic hydrocarbon fraction containing about 81.5 volume percent cyclohexane which, upon chilling to —50° F., forms a slurry of approximately 11.3 volume percent cyclohexane crystals. An aromatic fraction containing about 24.4 volume percent benzene which, upon chilling to approximately —90° F., produces a slurry containing about 4.1 volume percent benzene crystals. A feed stock containing about 45 volume percent orthoxylene and the remainder mainly metaxylene which, upon chilling to —75° F., produces a slurry of 12.7 volume percent solids content. A hydrocarbon solution containing 15 volume percent naphthalene which, upon chilling to —60° F. produces a slurry of about 10 volume percent solids content.

By way of specific example, a feed stock containing from 12 to 25 volume percent of paraxylene is sent to a first chilling and crystallizing zone to form a slurry having solids within the range of 8 to 10 volume percent. This slurry is then fed to the body of liquid consisting of a crystal growing pool from which a circulating stream is continuously withdrawn, passed through a scraped surface heat exchanger and returned to the crystal growing pool. A stream is continuously withdrawn from the body of liquid, passed to an isothermal filtration zone, such as a line filter, the filtrate discarded and the concentrated slurry returned to the body of slurry. In this way the solids concentration of the body of slurry is built up and maintained within the range of 30 to 60 volume percent.

The present invention will now be described in greater detail in conjunction with the drawing in which:

Fig. 1 is in the form of a diagrammatic flow sheet showing one preferred mode for carrying out the present invention;

Fig. 2 is in the form of a diagrammatic flow sheet showing another preferred mode for carrying out the present invention; and Fig. 3 is in the form of an elevation partly in section showing a line filter adapted to be used in the method carried out in the flow sheets of Fig. 1 and Fig. 2.

Throughout the specification and drawings, like numerals refer to like parts.

By way of illustration, the procedure carried out in Fig. 1 will be described in conjunction with a specific hydrocarbon feed stock mixture containing paraxylene and isomeric xylenes.

Turning now specifically to Fig. 1, a mixture of paraxylene and isomeric xylene is withdrawn from storage tank 11 through line 12 and passed to a distillation unit 13. From distillation unit 13 a bottoms fraction is withdrawn through outlet line 14 and an overhead fraction is withdrawn through outlet line 15. An orthoxylene fraction may be withdrawn through side stream 16 and a fraction containing within the range of 16 to 20 volume percent paraxylene is withdrawn through side stream 17.

The paraxylene containing fraction passes through drier 18 which may, for example, be a vessel containing alumina and then passes by line 19 to a first chilling and crystallizing zone consisting of pre-chiller A, scraped surface chiller B, and crystal growing tank C. For example, unit A may be an ethylene prechiller which chills the charge to −50° F. and vessel C may be a stirred mixing tank where slurry is held for an average residence time within the range of ½ to 4 hours at a temperature of −80° F. Preferably, scraped surface chiller B is operated at a speed within the range of 10 to 20 R. P. M. Thus, paraxylene feed stock from drier 18 passes through line 19 to pre-chiller A and from pre-chiller A through line 20 to scraped surface chiller B and from scraped surface chiller B through line 21 to tank C. Slurry is withdrawn from the bottom of tank C through line 22, is pumped by pump 23 and passes through circulating line 24 back into line 20 where it is mixed with fresh incoming feed.

Recycle filtrate from a later crystallization stage is returned to the unit at this point being introduced either through line 25 into charge stock in line 19 or through line 26 into the recirculating slurry in line 24.

Slurry from the first crystallizing and chilling zone is used as the charge stock for the body of slurry maintained in a system which includes scraped surface chiller D, crystal growing tank E, and line filter F and connecting lines. In this system slurry from scraped surface chiller D passes through line 30 to holding tank E and slurry is withdrawn through the bottom of holding tank E by line 31 pumped by pump 32 and passes through circulating line 33 and line 34 to the inlet of scraped surface chiller D. It is preferred to maintain slurry in holding tank E for an average residence time within the range of ½ to 4 hours at a temperature of −95° F. It is preferred to operate scraped surface chiller D at a speed within the range of 10 to 20 R. P. M.

From the first crystallizing and chilling zone consisting of units B and C with connecting lines, slurry is withdrawn from line 24 by way of line 35 and thus becomes a part of the body of slurry and upon mixture with slurry from line 33 is a portion of the body of slurry which is passed through chiller D to crystallizing tank E and is recycled back to tank E by way of line 31, pump 32, lines 33 and 34 and thence through scraped surface chiller D and line 30. From the body of slurry as described, a portion is removed through line 36 and passes to an isothermal filtration step carried out in line filter F. The isothermal filtration step separates the slurry fed thereto into a filtrate fraction which is withdrawn from the system through line 37 and a more concentrated slurry fraction which is withdrawn through line 38 and is returned by line 33 to said body of slurry.

Slurry is also withdrawn from line 33 through line 40 and passes to a second filtration zone G. By way of example, filtration zone G may be conducted in a basket type centrifuge in which there may be a temperature rise as much as 20° F. during the filtration step. Filtrate is withdrawn from second filtration zone G through line 41 and is recycled to the body of slurry in the system consisting of chiller D, holding tank E and connecting lines. It optionally may be introduced into line 30 by branch line 2 controlled by valve 3 or into line 21 by branch line 4 controlled by valve 5.

Filter cake is withdrawn from filtration zone G by conduit 42. While this material may be withdrawn as product, it is generally desirable to concentrate it and this procedure is shown on the drawing with conduit 42 discharging to melt tank H and product from the melt tank passed by line 43 to scraped surface chiller J and thence through line 44 to tank K. Slurry from tank K is withdrawn through line 45 and pumped by pump 46 into recirculating line 47 where it is admixed with the stream in line 43. A portion of the slurry is withdrawn from line 47 through line 48 and passed to a third filtration zone L which may, for example, be carried out in a second basket type centrifuge with the slurry separated into a paraxylene filter cake of high purity which is withdrawn as product through line 49 and into a filtrate which is passed by way of line 50 and may then be sent to branch line 25 by opening valve 51 in branch line 25 and closing valve 52 in branch line 26 or alternatively may be sent through ethylene chiller A′ and line 26 by closing valve 51 and opening valve 52.

It is preferred that the crystallization operation carried out by chillers J and K be at a temperature within the range of −20° to +20° F., the resulting filter cake having a purity of approximately 95 volume percent paraxylene and the filtrate recycled by line 50 having a paraxylene content of approximately 43 volume percent.

The procedure carried out in Fig. 2 will also be described in conjunction with a specific hydrocarbon feed stock mixture containing paraxylene and isomeric xylenes.

Turning now specifically to Fig. 2, a mixture of paraxylene and isomeric xylene is withdrawn from storage tank 11 through line 12 and passed to distillation unit 13. From distillation unit 13 a bottoms fraction is withdrawn through outlet line 14 and an overhead fraction is withdrawn through outlet line 15. An orthoxylene fraction may be withdrawn through side stream 16 and a fraction containing within the range of 16 to 20 volume percent paraxylene is withdrawn through side stream 17.

As in the case of Fig. 1, paraxylene feed stock passes through the drier 18 and the line 19 to pre-chiller A and from pre-chiller A through line 20 to scraped surface chiller B and from scraped surface chiller B through line 21 to tank C. Units A, B and C may be operated in the manner described above in connection with Fig. 1. Slurry is withdrawn from the bottom of tank C through line 22, is pumped by pump 23 and passes through circulating line 24 back into line 20 where it is mixed with fresh incoming feed.

Recycle filtrate from a later crystallization stage is returned to the unit at this point being introduced either through line 25 into charge stock in line 19 or through line 26 into recirculating slurry in line 24.

Slurry from the first crystallizing and chilling zone is used as the charge stock for the body of slurry maintained in a system which includes scraped surface chiller D, crystal growing tank E, and connecting lines which may also be operated in the manner described in Fig. 1. Thus, slurry from scraped surface chiller D passes through line 30 to holding tank E and slurry is withdrawn through the bottom of holding tank E by line 31 pumped by pump 32 and passes through circulating line 33 and line 34 to the inlet of scraped surface chiller D.

From the first crystallizing and chilling zone consisting of units B and C with connecting lines, slurry is withdrawn from line 24 by way of line 35 and thus becomes a part of the body of slurry and upon mixture with slurry from line 33 is a portion of the body of slurry which is passed by line 34 to chiller D, from the chiller to crystallizing tank E and is recycled back to chiller D by way of line 31, pump 32 and lines 33 and 34. From the body of slurry as described a portion is removed through line 36 and passes to an isothermal filtration step carried out in line filter F. The isothermal filtration step separates the slurry fed thereto into a filtrate fraction which is withdrawn from the system by line 37 and a more concentrated slurry fraction which is withdrawn through line 38 and is returned by line 33 to said body of slurry. The solids in the body of slurry maintained in tank E, scraped surface chiller D and connecting lines are within the range to 30 to 60 volume percent when equilibrium conditions have been reached after starting up.

Slurry from the body of slurry maintained in crystallizing tank E, scraped surface chiller D and connecting lines is withdrawn from line 33 by line 80 to a crystal growing tank M where the average crystal size of the slurry is substantially increased. Slurry tank M is maintained at a temperature substantially above the temperature of the body of slurry in tank E, scraped surface chiller D and connecting lines but below the melting point of the crystals in order to encourage crystal growth, it will generally be preferable to maintain the temperature of the slurry in tank M within the temperature range of —20° to +20° F. The solids content of slurry in crystal growing tank M will be less than the solids content of the slurry charged to it from the body of slurry maintained in tank E, scraped surface chiller D and connecting lines; in the specific example being described, the solids content in tank M is within the range of 10 to 30 volume percent solids and preferably about 20 volume percent.

Slurry from crystal growing zone M is passed by line 82 to filtration zone N which may, for example, be carried out in a basket type centrifuge with the slurry separated into a paraxylene filter cake of high purity which is withdrawn as product through line 84 and into a filtrate which is passed by way of line 86 and may then be sent to branch line 25 by opening valve 51 and closing valve 52 or, alternatively, may be sent through ethylene chiller A' and line 26 by closing valve 51 and opening valve 52.

It is preferred to conduct the crystal growing step in vessel M at a temperature within the range of —20° to +20° F. (this temperature is secured by any convenient temperature adjusting means such as heating coils) and under these conditions a filter cake having a purity of approximately 95 volume percent paraxylene may be obtained as product and the filtrate recycled by line 40 has a paraxylene content of approximately 43 volume percent.

It is another advantage of this form of the invention that the only filter cake formed is formed from a slurry which has been subjected to a crystal growing step at a temperature substantially greater than that at which the step of concentrating crystals in slurry is carried out so that the dual advantages of rapid filtration and a high purity filter cake are achieved.

Details of construction of a suitable line filter for use as filter F are shown in Fig. 3. As seen in Fig. 3, the line filter consists of a tubular shell 60 and an inner tubular member 61 provided with a filter medium such as a filter cloth 62. Between the outer shell 60 and the filter medium 62 is an annular space 63 which is sized in conjunction with the input of the filter so that the slurry passing through this annular space will travel at such a rate as to produce flow in the turbulent region. As the slurry passes through this annulus 63, part of the mother liquor drains through the porous medium 62 and discharges through line 37. Because of the high velocity of the flowing slurry, the solids which are contained therein do not coat the filter medium but instead are swept from the surface and pass out of the filter shell 60 through outlet line 38 as concentrated slurry. This concentrated slurry is pumpable and may contain solids within the range of 30 to 60 volume percent. Backwash for washing off the filter medium at suitable intervals may be introduced through line 64. The proportion of the solids in the slurry withdrawn through line 38 may be regulated by controlling the rate at which filtrate is withdrawn through the filter medium 62.

As heretofore explained, the operation conducted in filter F is isothermal. No mechanical heat is produced within the filter so that the material passing out of the filter is at substantially the same temperature as the feed to the filter. This is a substantial advantage in that it prevents a considerable loss of desirable product which otherwise results from the heating up of the charge slurry passed to a filter which does not filter under isothermal conditions.

It is a further feature of the present case that the only fractions removed from the system are the filtrate separated from the isothermal filtration step and the final filter cake. Thus, full advantage is taken of the isothermal filtration step in increasing the recovery of desired product from the feed stock.

Having fully described and illustrated the practice of the present invention, what is desired to be claimed and secured by Letters Patent are:

1. In a process for recovering a selected cyclic hydrocarbon compound from a feed stock consisting essentially of a mixture of cyclic hydrocarbon compounds by chilling said mixture to selectively crystallize said selected compound to form a slurry of less than 30 weight percent of crystals of said selected compound in a mother liquor consisting of uncrystallized hydrocarbon compounds initially present in said feed stock, the improvement which comprises the steps of establishing a body of slurry of crystals of said selected compound in said mother liquor at about the lowermost temperature of selective crystallization for said selected compound, withdrawing a stream of said slurry from said body while maintaining said body at about said lowermost temperature of selective crystallization and turbulently isothermally filtering said stream to separate a portion of said mother liquor from said stream, discarding said portion of said mother liquor and returning the remaining portion of said stream to said body in an amount sufficient to increase the crystals content of said body to about 30 to 60 weight percent and, after an average residence time of about 0.5 to 4 hours, recovering crystallized selected hydrocarbon from said thus concentrated body of slurry.

2. A process as in claim 1 wherein the feed stock consists essentially of a mixture of isomeric xylenes and wherein the selected organic compound is paraxylene.

3. In a process for recovering a selected cyclic hydrocarbon compound from a feed stock consisting essentially of a mixture of cyclic hydrocarbon compounds by chilling said mixture to selectively crystallize said selected compound to form a slurry of less than about 30 weight percent of crystals of said selected compound in a mother liquor consisting of uncrystallized hydrocarbon compounds initially present in said feed stock, the improvement which comprises the steps of establishing a body of slurry of said selected compound in said mother liquor at about the lowermost temperature of selective crystallization for said selected compound, continuously withdrawing a stream of said slurry from said body while maintaining said body at about said lowermost temperature of selective crystallization and turbulently isothermally filtering said stream to separate a portion of said mother liquor from said stream, discarding said portion of said mother liquor and returning the remaining portion of said stream to said body in an amount sufficient to increase the crystals content of said body to about 30 to 60 weight percent, removing from said body a slurry fraction after an average residence time within the range of about 0.5 to 4 hours and subjecting said slurry fraction to a non-isothermal filtration step to form a filtrate fraction consisting of mother liquor and a filter cake fraction comprising crystals of said organic compound, withdrawing said filter cake fraction as product, returning said filtrate fraction to said body of slurry and adding feed stock to said body of slurry in an amount sufficient to replace material withdrawn therefrom, whereby the only components removed from said body of slurry are said filter cake fraction and said isothermally separated portion of said mother liquor.

4. In a process for recovering a selected cyclic hydrocarbon compound from a feed stock consisting essentially of a mixture of cyclic hydrocarbon compounds by chilling of said mixture to selectively crystallize said selected compound to form a slurry of less than about 30 weight percent of crystals of said selected compound in a mother liquor consisting of uncrystallized hydrocarbon compounds initially present in said feed stock, the improvement which comprises the steps of progressively chilling said feed stock to about the lowermost temperature of selective crystallization for said compound, establishing a first body of slurry of crystals of said selected compound in said mother liquor at about said lowermost temperature, continuously withdrawing a stream of said slurry from said first body while maintaining said body at about said lowermost temperature of selective crystallization and turbulently isothermally filtering said stream to separate a portion of said first body mother liquor from said stream, discarding said portion of said first body mother liquor and returning the remaining portion of said stream to said first body in an amount sufficient to increase the crystals content of said first body to about 30 to 60 weight percent, removing a slurry fraction after an average residence time within the range of about 0.5 to 4 hours from said first body and subjecting said slurry fraction to a non-isothermal filtration step to form a first non-isothermal filtrate fraction consisting of mother liquor and a filter cake fraction comprising crystals of said organic compound, returning said first non-isothermal filtrate fraction to said first body of slurry, recovering said filter cake fraction and melting the same, chilling said thus obtained melt to a temperature approximating the initial temperature of crystallization of said selected compound to form a second body of slurry consisting of crystals of said selected compound in a second mother liquor, non-isothermally filtering slurry from said second body to obtain a high purity filter cake fraction consisting essentially of crystals of said selected compound and a second non-isothermal filtrate fraction containing an appreciable portion of said selected compound, recovering said second filter cake as product, returning said second non-isothermal filtrate to said first body of slurry, and adding feed stock to said first body of slurry to replace crystallized product and discarded mother liquor whereby said crystallized product and said discarded first body mother liquor are the only components removed.

5. A method as in claim 4 wherein the feed stock consists essentially of a mixture of isomeric xylenes and wherein the selected organic compound is paraxylene.

6. A method for recovering paraxylene from a feed stock consisting essentially of a mixture of isomeric xylenes containing about 15% to 25% by volume of paraxylene which comprises the steps of progressively chilling said feed stock to a temperature of about −95° F. to form a first body of slurry consisting of about 10 weight percent of crystals of paraxylene in a first mother liquor consisting of uncrystallized components of said feed stock, continuously withdrawing a stream of slurry from said first body while maintaining said first body at about said lowermost temperature of crystallization and turbulently isothermally filtering said stream to remove a portion of said first mother liquor therefrom, discarding said thus-removed portion of said first mother liquor, returning the remaining portion of said stream to said first body in an amount sufficient to increase the crystals content of said first body to about 30 to 60 weight percent, removing a slurry fraction from said first body after an average residence time of about 0.5 to 4 hours and non-isothermally filtering said slurry fraction to form a first filter cake consisting of paraxylene crystals and entrained mother liquor and a first non-isothermal filtrate portion, returning said first non-isothermal filtrate portion to said first body of slurry, recovering said first filter cake fraction and melting the crystals contained therein, chilling said thus obtained melt to a temperature within the range of about −20° to +20° F. to form a second slurry consisting of crystals of paraxylene in a second mother liquor containing an appreciable percentage of uncrystallized paraxylene, filtering at least a portion of said second slurry non-isothermally to obtain a second filter cake consisting essentially of paraxylene crystals and a second non-isothermal filtrate consisting of said second mother liquor, returning said second non-isothermal filtrate to said first body of slurry, recovering said second filter cake as product and adding feed stock to said first body of slurry to replace crystallized product and first mother liquor withdrawn therefrom whereby said second filter cake and said isothermally filtered first body mother liquor are the only components removed during said process.

7. A method for recovering paraxylene from a feed stock consisting essentially of a mixture of isomeric xylenes containing about 15 to 25 percent by volume of paraxylene which comprises the steps of continuously chilling said feed stock to a temperature of about −80° F. to form a first body of slurry consisting of about 10 weight percent of paraxylene crystals in uncrystallized components of said feed stock, continuously withdrawing a transfer portion of said first slurry from said first body at a rate sufficient to maintain said first slurry in said first body for an average residence time of about 0.5 to 4 hours and chilling said transfer portion to a temperature of about −95° F. to form a second body of slurry, continuously withdrawing a stream of slurry from said second body while maintaining said second body of slurry at a temperature of about −95° F. and continuously turbulently isothermally filtering said stream to remove a portion of second body mother liquor therefrom, discarding said isothermally obtained portion of said second body mother liquor, continuously returning the remaining portion of said stream to said second body in an amount sufficient to increase the crystals content of said second body to about 30 to 60 weight percent, continuously removing a discharge portion of the slurry from said second body at a rate sufficient to maintain an average slurry residence time of about 0.5 to 4 hours in said second body, and non-isothermally filtering said discharge portion to form a first non-isothermal filtrate fraction consisting of mother liquor and a first filter cake fraction consisting of paraxylene crystals and entrained mother liquor, melting said first filter cake, chilling said thus obtained melt to a temperature within the range of −20° to +20° F. to form a third body consisting of a slurry of paraxylene crystals in a third mother liquor, withdrawing slurry from said third body and non-isothermally filtering the same to obtain a second filter cake consisting essentially of paraxylene crystals and a second non-isothermal filtrate consisting essentially of said third mother liquor, returning said non-isothermally obtained filtrates to said first body, and adding feed stock to said first body to replace material withdrawn from said process whereby the only components withdrawn are said isothermally obtained second body mother liquor and said second filter cake.

8. In a process for recovering a selected cyclic hydrocarbon compound from a feed stock consisting essentially of a mixture of cyclic hydrocarbon compounds by selective crystallization of said selected compound, the improvement which comprises the steps of chilling said feed stock to about the lowermost temperature of selective crystallization for said compound to establish a first body of slurry of crystals of said selected compound in a mother liquor consisting of uncrystallized components of said feed stock, withdrawing a stream of slurry from said first body, turbulently isothermally filtering said stream to separate a portion of said first body mother liquor from said first body stream for discard and returning the remaining portion of said stream to said first body while maintaining said first body of slurry at about said lowermost temperature of selective crystallization, the amount of thus-separated and discarded mother liquor being sufficient to provide about a 30 to 60 volume percent crystal concentration in said first body, removing a portion of said thus-concentrated first body slurry after an average residence time of about 0.5 to 4 hours and warming the same to about the uppermost temperature of selective crystallization of said compound to provide a second body of slurry containing about 10 to 30 volume percent of crystals, withdrawing a fraction of said second slurry and non-isothermally filtering the same to form a high purity filter cake consisting essentially of crystals of said selected compound and a filtrate rich in uncrystallized selected compound, returning said non-isothermally obtained filtrate to said first body of slurry and recovering said high purity filter cake as product, whereby the non-isothermally obtained filter cake and the turbulently isothermally obtained first body mother liquor portion are the only components removed.

9. A process as in claim 8 wherein the feed stock consists essentially of a mixture of isomeric xylenes and wherein the selected organic compound is paraxylene.

10. A method for recovering paraxylene from a feed stock consisting essentially of a mixture of isomeric xylenes containing about 15% to 25% by volume of paraxylene which comprises the steps of progressively chilling said feed stock to a temperature of about —95° F. to form a first body of slurry consisting of crystals of paraxylene in a first mother liquor consisting of uncrystallized components of said feed stock, continuously withdrawing a stream of slurry from said first body and turbulently isothermally filtering the same to remove a portion of said first body mother liquor therefrom while maintaining said first body of slurry at a temperature of about —95° F., discarding said thus removed portion of said first body mother liquor, the amount of thus separated and discarded first body mother liquor being sufficient to provide about a 30 to 60 volume percent crystal concentration in said first body, removing a portion of said thus concentrated first body slurry after an average residence time of about 0.5 to 4 hours and warming the same to a temperature within the range of about —20° to +20° F. to form a second body of slurry containing about 10 to 30 volume percent of crystals, withdrawing a fraction of said second slurry and non-isothermally filtering the same to form a high purity filter cake consisting essentially of crystallized paraxylene and a filtrate rich in uncrystallized paraxylene, returning said non-isothermally obtained filtrate to said first body of slurry and recovering said high purity filter cake of paraxylene as product, whereby the non-isothermally obtained paraxylene filter cake and turbulently isothermally removed first body mother liquor are the only components removed.

11. A method for recovering paraxylene from a feed stock consisting essentially of a mixture of isomeric xylenes containing about 15 to 25 percent by volume of paraxylene which comprises the steps of continuously chilling said feed stock to a temperature of about —80° F. to form a first body of slurry consisting of paraxylene crystals in uncrystallized components of said feed stock continuously withdrawing a portion of the slurry from said first body at a rate sufficient to maintain said slurry in said first body for an average residence time of about 0.5 to 4 hours and chilling the same to a temperature of about —95° F. to form a second body of slurry, continuously withdrawing a stream of slurry from said second body and continuously turbulently isothermally filtering said second body stream to remove a portion of the second body mother liquor therefrom while maintaining said second body of slurry at a temperature of about —95° F., discarding said isothermally removed portion of said second body mother liquor, the amount of thus separated and discarded second body mother liquor being sufficient to provide a 30 to 60 volume percent crystal concentration in said second body, removing a portion of said second body of slurry after an average residence time of about 0.5 to 4 hours and warming said removed portion to a temperature within the range of about —20° to +20° F. to form a third body of slurry containing about 10 to 30 volume percent of crystals, withdrawing a fraction of said third slurry, non-isothermally filtering said withdrawn fraction of said third slurry to form a filter cake consisting essentially of crystallized paraxylene and a filtrate rich in uncrystallized paraxylene, returning said non-isothermally obtained paraxylene-rich filtrate to said first body of slurry and recovering said filter cake of paraxylene as product, whereby the non-isothermally obtained paraxylene filter cake and turbulently isothermally removed second body mother liquor are the only components removed.

References Cited in the file of this patent

UNITED STATES PATENTS

| | | |
|---|---|---|
| 2,540,977 | Arnold | Feb. 6, 1951 |
| 2,665,316 | Bennett | Jan. 5, 1954 |
| 2,747,001 | Weedman | May 22, 1956 |
| 2,757,216 | Speed et al. | July 31, 1956 |